March 7, 1933.  L. M. HILE  1,900,181
BASKET HANDLE MACHINE
Filed Aug. 17, 1931  5 Sheets-Sheet 2
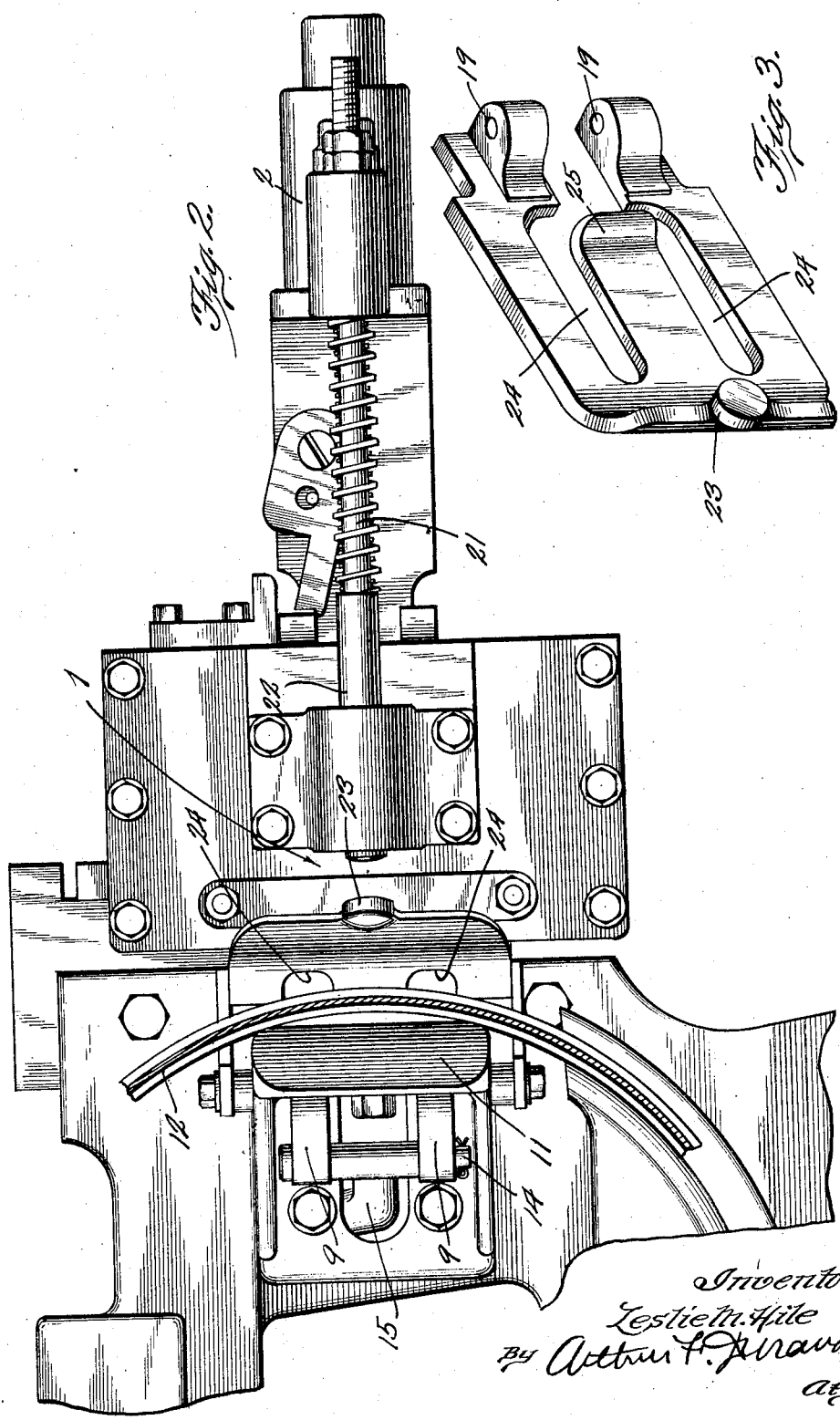
Inventor:
Leslie M. Hile

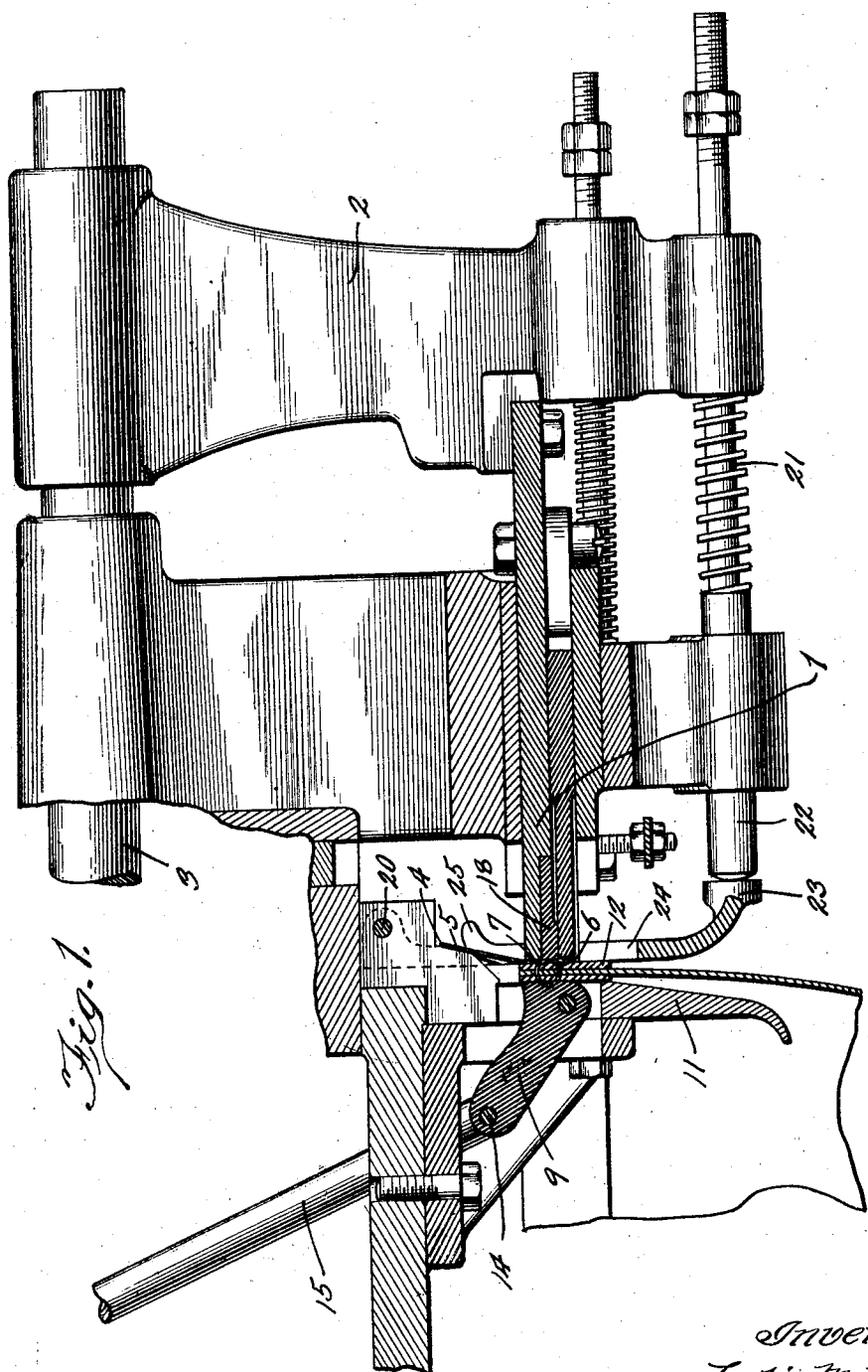

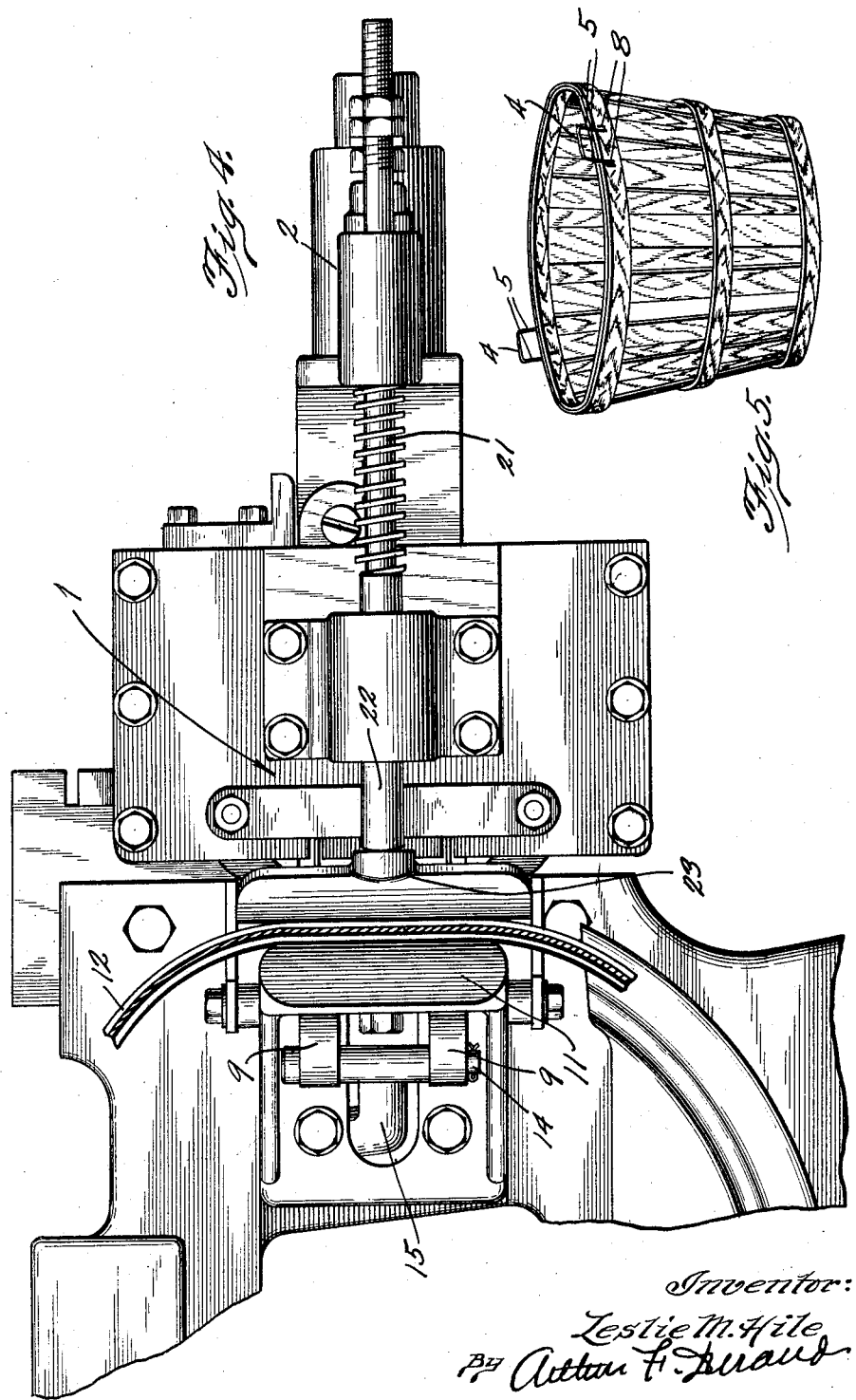

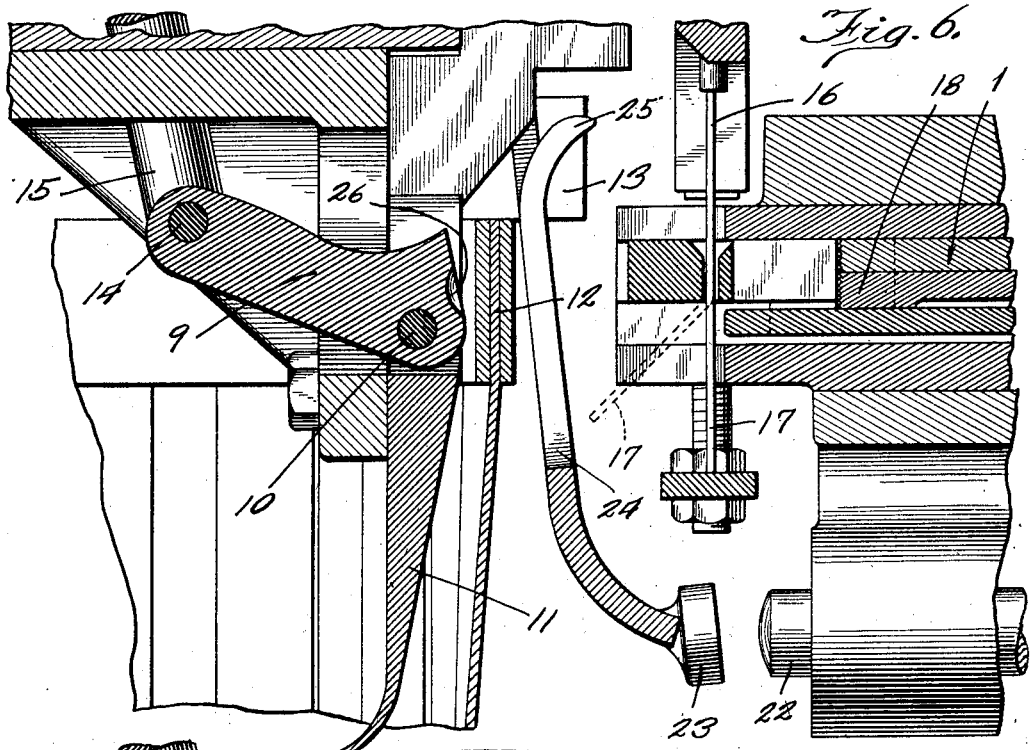
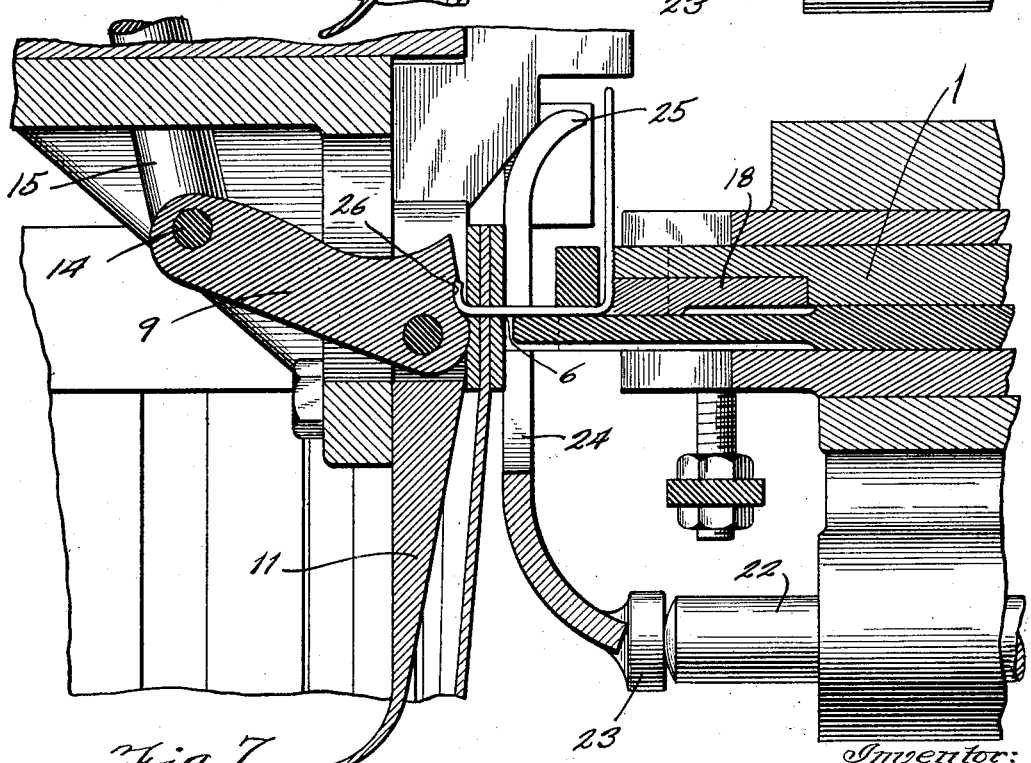

March 7, 1933. L. M. HILE 1,900,181
BASKET HANDLE MACHINE
Filed Aug. 17, 1931   5 Sheets-Sheet 5
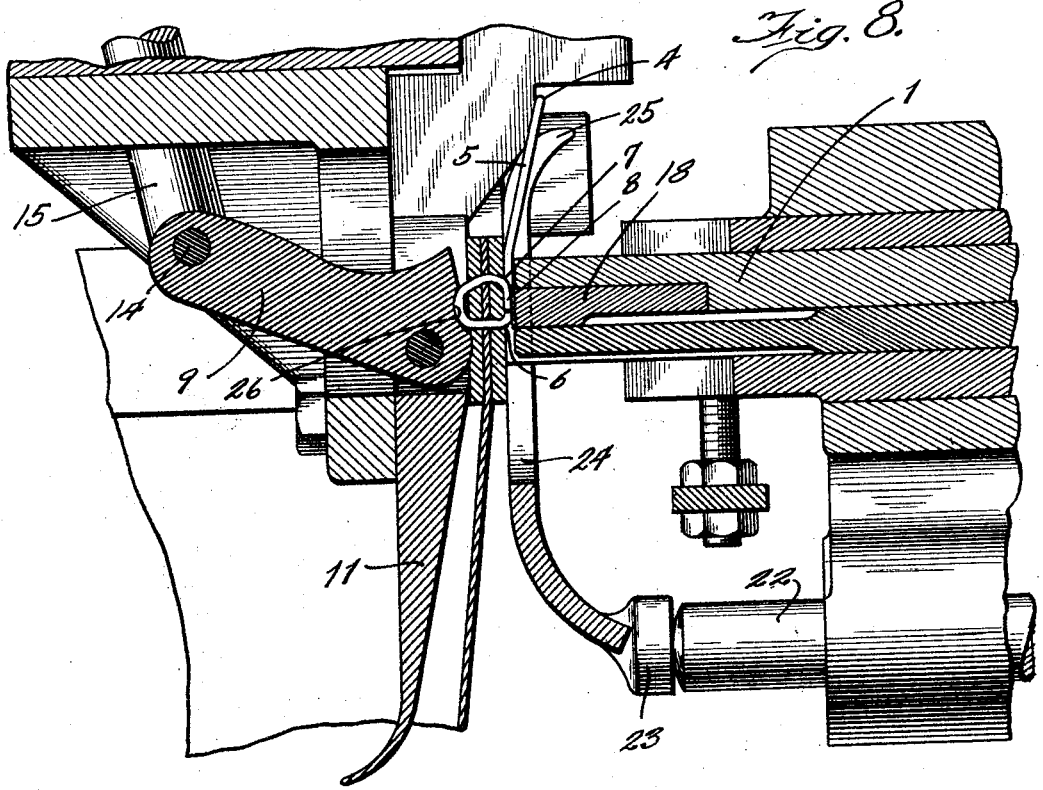
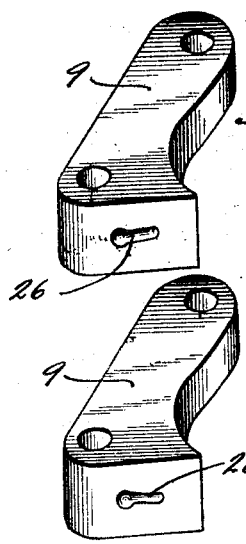
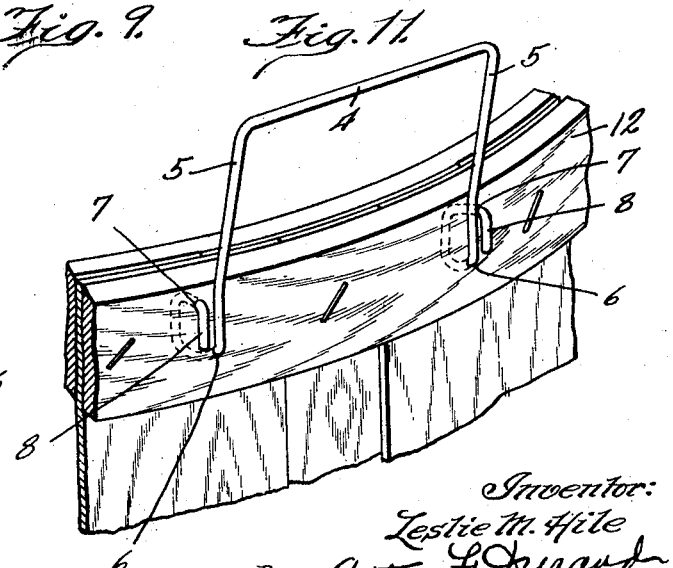
Inventor:
Leslie M. Hile Patented Mar. 7, 1933

1,900,181

UNITED STATES PATENT OFFICE

LESLIE M. HILE, OF BENTON HARBOR, MICHIGAN

BASKET HANDLE MACHINE

Application filed August 17, 1931. Serial No. 557,518.

This invention relates to basket handle machines, and more particularly to those for attaching wire handles to bushel or half-bushel baskets.

Generally stated, the object of the invention is to provide a novel and improved construction and arrangement whereby the ends of the wire handle are inserted through the rim of the basket, and are then bent around and again inserted through the rim of the basket, whereby each end portion of the wire handle passes twice through the rim structure of the basket, and whereby each final end portion is then bent or clinched against the rim, whereby a handle is produced which is not likely to work loose in the basket, and which may be bent outwardly and then back again, as in securing a basket cover in place, without injuring the fruit or other contents of the basket, and without weakening or disturbing the attached end portions of the handle.

It is also an object to provide certain details and features of construction and combinations tending to increase the general efficiency and the desirability of a basket handle machine of this particular character.

To the foregoing and other useful ends, the invention consists in matters hereinafter set forth and claimed and shown in the accompanying drawings in which—

Fig. 1 is a horizontal plan section of a portion of the machine embodying the principles of the invention.

Fig. 2 is a front elevation of the mechanism shown in Fig. 1.

Fig. 3 is a perspective of a portion of said mechanism.

Fig. 4 is a view similar to Fig. 2, showing the parts in different positions.

Fig. 5 is a perspective of one of the baskets having handles of the kind that are made and attached by said machine.

Fig. 6 is an enlarged plan section of a portion of the machine, showing the parts in certain positions, preliminary to bending the legs of the wire bail and inserting them into the basket.

Fig. 7 is a similar view showing the parts in different positions, the wire bail having been bent and partially inserted through the rim of the basket.

Fig. 8 is a similar view showing the handle fully inserted and clinched.

Figs. 9 and 10 are perspectives of the two clinch blocks which are employed as a part of the clinching mechanism to bend and deflect the inserted handle ends back through the basket rim, preliminary to the final clinching of the wire ends upon the rim of the basket.

Fig. 11 is a perspective of one of the handles in its final or finished condition, showing the adjacent portion of the basket to which the handle is attached.

As thus illustrated, the invention comprises a handle inserting mechanism 1 of any suitable or desired construction, adapted to receive a bail-shaped preliminary handle blank, so to speak, bend the ends thereof, and insert these ends through the rim of the basket. This handle inserting or driving mechanism is common and well-known, and does not need further description. It should be understood, however, that this mechanism is disposed at the right-hand side of the machine, and that similar mechanism, turned end for end, is disposed at the left-hand side of the machine, whereby two handles are made and applied at the same time. It is common to insert two handles at the same time, at opposite sides of the basket, and a description of one inserting mechanism will be sufficient, for this mechanism can be used singly if desired. The reciprocating head 2 of the handle driving mechanism 1 is operated by any suitable known or approved means, such as the reciprocating rod 3, whereby said mechanism is reciprocated in the manner of a stapler, to bend the ends of the wire bail and insert them through the rim of the basket.

It will also be understood that the means for forming the preliminary blanks of bail-shaped form, which are like large staples in shape, and for delivering these blanks to the handle inserting or driving mechanism 1, may be of any suitable known or approved character, forming mechanism of this kind being common and well-known.

For a better understanding of the purpose of the invention, it will be seen from Fig. 11 of the drawings that the wire handle comprises the transverse portion 4, and the parallel side portions or legs 5, the ends of the said legs 5 being first inserted through the basket rim at 6, then bent or curled backward and inserted again through the basket rim at 7, and then bent downward to form final end portions 8 which are clinched against the outer surface of the basket rim. It is the mechanism for effecting this particular form of insertion of the handle ends, and for clinching the handle ends, that constitutes the invention in this case, which is as follows:

As shown in Figs. 6, 7, and 8, the clinch blocks 9 are similar in form, except that one is a right and the other is a left, whereby to clinch one end of the handle immediately outside of the leg 5 at one side, and to clinch the other end portion 8 immediately outside of the other leg 5 of the handle, whereby the two side portions or legs 5 of the handle are disposed between the final clinched end portions 8 of the handle. These clinch blocks are pivoted at 10 to oscillate about a vertical axis. The member 11 is formed to receive the rim portion 12 of the basket, in the manner shown in the drawings, and is provided with a stop or gauge 13 to engage the rim of the basket, thereby to accurately position the rim portion to receive the handle. Said clinch blocks 9 are connected together by a pivot 14, and are operated by a rod or reciprocating member 15, which latter can be connected to any suitable power means, thereby to actuate said clinch blocks in properly timed relation to the insertion of the handle ends through the rim of the basket. Fig. 6 shows the wire bail-shaped blank or member 16 in position to have its end portions bent at right angles as shown in dotted lines at 17, and shows the clinching mechanism in normal condition. When the mechanism 1 operates in the usual manner to insert the end portions of the handle through the rim of the basket, as shown in Fig. 7 of the drawings, the clinch blocks 9, while in tilted position, receive the ends of the wire handle and deflect them toward the upper edge of the rim of the basket. The driving action continuing, the handle ends are finally inserted again through the basket rim, outwardly this time, as shown in Fig. 8 of the drawings, and the end portions 8 are then clinched by the driver 18 of the handle driving mechanism against the outer surface of the rim of the basket. It will be understood that this handle clinching mechanism is at the right side of the machine, to cooperate with the right-hand handle driving mechanism 1, and it will be understood that this clinching mechanism is duplicated at the left-hand side of the machine, whereby, as previously stated two handles are made and applied at the same time.

In order to hold the basket firmly in place on the supporting member 11, during the handle inserting operation, a clamp is provided, at each side of the machine, such as the clamp shown in Fig. 3 of the drawings. This clamp has portions 19 that are pivoted at 20 (see Fig. 1) to a stationary portion of the machine, whereby this clamp is operative about a vertical axis, and is adapted to bear against the rim of the basket in the manner shown. The pressure for operating this clamp is preferably obtained by providing the handle driving head 2 with a spring-pressed rod 21 having an end portion 22 adapted to bear against the engaging portion 23 of said clamp, whereby spring pressure is exerted against the clamp to yieldingly hold it firmly against the side of the basket rim, during the handle inserting and clinching operation. It will be seen that this clamp is provided with slots 24 through which the drivers of the handle driving mechanism are operative to drive the end portions of the handle through the rim of the basket. It will also be seen that the said clamp has an outturned lip portion 25, and the purpose of this is to cause the transverse portion 4 of the handle to pass under the clamp when the basket is pulled outwardly, after the two handles are attached thereto. In other words, as soon as the handle applying operation is finished, the basket is pulled outwardly, and the two handles will pass underneath the lips 25 of the two clamps, and will thus pass outwardly from between the clamps and the member 11, against which the inner side of the rim is held by the clamp at each side of the machine.

Referring again to Figs. 9 and 10, it will be seen that the grooves 26 in the two clinch blocks are formed to bend the wire in the manner shown in Fig. 8 of the drawings, so that the handle end portions will, as previously explained, be deflected outwardly through the rim of the basket, at points immediately outside of the legs or parallel side portions of the handle, whereby these two end portions are brought into position to then be bent against the outer side of the basket rim by the handle driving mechanism, as shown and described.

It will be understood that the power means and power transmitting instrumentalities for operating the parts shown and described may be of any suitable known or approved character, and do not need further description or explanation, as they do not form a part of the invention.

Thus, as shown, clinch blocks are provided for bending the handle ends back through the rim of the basket, which operate about a vertical axis, there being preferably a pair of these clinch blocks at each side of the machine, as previously explained. In this way each pair of clinch blocks operates about an axis extending at right angles to the axis of the basket, and the clincher mechanism thus constructed is adapted to enter the basket and operate within the basket to bend the wire in the manner shown and described. Each clinch block or clincher co-operates with the handle driving mechanism at the adjacent outer side of the basket rim, to cause the wire to pass successively through the basket rim at different points therein, so that each handle end passes twice through the basket rim, before the final end thereof is clinched against the rim. This insures a handle that can be bent outwardly, and then back again, as in securing a basket cover in place, without danger of loosening the handle in its bearings in the basket rim, and without danger of rocking or displacing some portion of the handle that might injure the fruit or other contents of the basket. Thus the machine is capable of producing and attaching a wire handle of this specific character, by mechanism that inserts and clinches the handle ends by practically one operation.

Thus it will be seen that clinching means are provided for bending the wire ends back into the basket rim, causing the wire ends to enter the basket rim in an outward direction. In the specific construction shown and described, the machine elements are formed and operative to cause the wire ends to penetrate the basket rim to an extent to pass out through the outer side of the rim, where the wire ends are finally clinched on the outer side of said rim. It will be understood, however, that the invention may be employed to force the wire ends any desired distance through or into the basket rim, in an outward direction.

What I claim as my invention is:

1. In a machine for inserting a wire handle in the rim of a basket, the combination of driving means for inserting the handle ends through the basket rim, clinching mechanism having clinchers for receiving the wire ends and bending and deflecting these ends back toward the upper edge of the basket and through the rim of the basket and against the driver, whereby to clinch the final ends of the wire handle against the side of the basket rim.

2. A structure as specified in claim 1, said clinchers comprising a pair of pivoted clinch blocks operative in unison toward and away from the rim of the basket.

3. A structure as specified in claim 1, said clinchers comprising a pair of pivoted clinch blocks disposed in position to enter the basket and engage the inner side of the basket rim, said clinch blocks being pivoted to oscillate about an axis at right angles to the axis of the basket.

4. A structure as specified in claim 1, said handle driving mechanism being disposed outside of the basket, and said clinching mechanism being disposed in position to enter the basket, whereby to drive the handle ends inwardly through the rim of the basket, at predetermined points therein, and whereby to cause the handle ends to then pass outwardly through the rim of the basket, and to bend the outwardly inserted ends against the outer side of the basket rim.

5. A structure as specified in claim 1, said handle driving mechanism and said clinching mechanism being disposed in position to insert the handle horizontally, whereby one bent and clinched end portion of the handle is above the other bent and clinched end portion of the same handle when the handle attaching operation is completed.

6. A structure as specified in claim 1, comprising a pivoted clamp adapted to bear against the outer side of the basket rim, and means for exerting pressure against said clamp, together with a basket support for engaging the inner side of the rim, to resist the pressure of said clamp.

7. A structure as specified in claim 1, comprising a pivoted clamp adapted to bear against the outer side of the basket rim, and means for exerting pressure against said clamp, together with a basket support for engaging the inner side of the rim, to resist the pressure of said clamp, said pressure means comprising a spring-backed element operated by the handle driving mechanism.

8. In a basket handle machine for attaching wire handles to baskets, the combination of a handle driving mechanism operative at one side of the rim of the basket, and handle clinching mechanism operative at the other side of the basket rim, adapted to co-operate to cause the handle end portions to successively pass a plurality of times, first at points below and thereafter at points above, through the two hoops of the basket rim.

9. A structure as specified in claim 8, said handle driving mechanism being disposed outside of the basket, and said handle clinching mechanism being disposed in position to enter the basket, whereby the handle ends are first inserted inwardly through the rim of the basket, and are thereafter inserted outwardly through the rim of the basket.

10. A structure as specified in claim 8, having means to clinch the final ends of the wire against the side of the basket rim.

11. A structure as specified in claim 8, said handle clinching mechanism comprising a pivoted clinch block for each end portion of the handle.

12. In a machine for attaching wire handles to baskets, the combination of a support for holding the basket rim in position to receive the inserted end portions of the handle, and clinching means formed and operative to bend the wire ends back toward the upper edge of the basket and into the inner side of the basket rim, causing the wire ends to enter the basket rim in an outward direction.

13. A structure as specified in claim 12, comprising means for clinching the wire ends on the outer side of the basket rim.

14. In a machine for inserting a wire handle in the rim of a basket, the combination of driving means for inserting the handle ends through the basket rim, clinching mechanism having clinchers for receiving the wire ends and bending and deflecting these ends back through the rim of the basket and against the driver, whereby to clinch the final ends of the wire handle against the side of the basket rim, comprising a pivoted clamp adapted to bear against the outer side of the basket rim, and means for exerting pressure against said clamp, together with a basket support for engaging the inner side of the rim, to resist the pressure of said clamp.

15. In a machine for inserting a wire handle in the rim of a basket, the combination of driving means for inserting the handle ends through the basket rim, clinching mechanism having clinchers for receiving the wire ends and bending and deflecting these ends back through the rim of the basket and against the driver, whereby to clinch the final ends of the wire handle against the side of the basket rim, comprising a pivoted clamp adapted to bear against the outer side of the basket rim, and means for exerting pressure against said clamp, together with a basket support for engaging the inner side of the rim, to resist the pressure of said clamp, said pressure means comprising a spring-backed element operated by the handle driving mechanism.

16. In a machine for inserting wire devices in materials, the combination of means for supporting the materials in position to receive said devices, driving mechanism for inserting the wire devices through the materials, and instrumentalities comprising deflecting means for bending the end portion of the wire back through the materials and into engagement with the driving mechanism, whereby the wire end is clinched or bent into final position by said mechanism.

17. A structure as specified in claim 16, said mechanism having means for inserting two wire end portions simultaneously, through said materials, and said instrumentalities comprising duplicate deflecting means for simultaneously bending the wire ends in the manner stated.

18. A structure as specified in claim 16, said mechanism being operative for inserting a wire device in the form of a bail-shaped wire handle for a basket, by inserting the two ends of the wire handle inwardly through the basket rim, and said instrumentalities comprising deflecting means in duplicate for bending and directing the wire ends back through the materials into engagement with the driving mechanism, to bend and clinch the wire as stated.

Specification signed this 12th day of August, 1931.

LESLIE M. HILE.